3,249,397
PROCESS FOR PREPARING PHOSPHONITRILIC CHLORIDE POLYMERS

George M. Nichols, Pitman, N.J., assignor to E. I. du Pont de Nemours and Company, Wilmington, Del., a corporation of Delaware
No Drawing. Filed Feb. 13, 1962, Ser. No. 172,878
3 Claims. (Cl. 23—14)

This invention relates to the production of liquid phosphonitrilic chloride polymers in improved yields. The liquid polymers, in addition, have enhanced thermal stability.

The preparation of phosphonitrilic chlorides by the reaction of phosphorus pentachloride an ammonium chloride in a solvent is known. The predominant fraction of the reaction product generally is a crystalline polymeric composition. The liquid fraction of the reaction product has found particular use as a working fluid and lubricant. Hence, a process whereby this liquid fraction is obtained in greater quantities is needed. The improvement in the thermal stability of these liquid polymers also is highly desirable.

I have found that when the reaction of phosphorus pentachloride and ammonium chloride is conducted in the presence of a specified amount of lithium chloride, the liquid phosphonitrilic chloride fraction is not only obtained in greater quantity but also the liquid fraction has enhanced thermal stability. Liquid phosphonitrilic chloride polymers prepared by the reaction of phosphorus pentachloride and ammonium chloride alone, i.e., in the absence of lithium chloride, polymerize further to a rubbery solid upon heating to a temperature of 250–350° C.

In accordance with this invention, liquid polymers stable at temperatures of 250 °C. and above are prepared by heating, at a temperature from 120 to 213° C., phosphorus pentachloride, ammonium chloride, and lithium chloride in the presence of 1,2,4-trichlorobenzene as a solvent, removing the solid and volatile materials, and recovering the liquid product. At least one mole of ammonium chloride and from 0.05 to 0.5 mole of lithium chloride should be present for each mole of phosphorus pentachloride.

The liquid phosphonitrilic chloride fraction of the reaction product is a mixture of oils consisting of polymers having degrees of polymerization ranging from 5 to about 15. Mixtures of these polymers have an average degree of polymerization of approximately 7. This liquid fraction has a wide temperature range between the freezing and boiling point.

The amount of lithium chloride used in the preparation of the liquid product of the invention is critical. The ratio of lithium chloride to phosphorus pentachloride must be between 0.05 and 0.5 mole per mole of phosphorus pentachloride. When less than 0.5 mole of lithium chloride is provided for each mole of phosphorus pentachloride, the yield of liquid phosphonitrilic chloride and the thermal stability of this product are essentially the same as the product obtained from the reaction of phosphorus pentachloride and ammonium chloride alone. When more than 0.5 mole of lithium chloride is provided for each mole of phosphorus pentachloride, the yield and the thermal stability of liquid phosphonitrilic chloride also are lowered. The preferred amount of lithium chloride used is 0.1 mole for each mole of phosphorus pentachloride.

Generally, the ammonium chloride is present in excess of one mole for each mole of phosphorus pentachloride. Amounts greater than 1.4 moles for each mole of phosphorus pentachloride are not recommended because no economic advantages entails therefrom and the subsequent removal of excess unreacted ammonium chloride is only necessitated.

As the inert solvent-medium for the reaction, 1,2,4-trichlorobenzene has been found to be the most satisfactory. The amount of 1,2,4-trichlorobenzene used as solvent is not critical, provided that a sufficient amount is used to dissolve at least a portion of the solid reactants, i.e., phosphorus pentachloride and ammonium chloride. Of course, the reaction rate improves substantially when a significant portion of the solid reactants are in solution. The use of large quantities of solvent is not recommended because of the necessity of subsequent removal of the solvent from the reaction product.

The temperature at which the reaction is conducted lies between 120 and the boiling point of 1,2,4-trichlorobenzene, i.e., 213° C. At temperatures below 120° C., the reaction is so slow as to be economically unfeasible, the presence of lithium chloride having a deactivating effect. Temperatures above 213° C. may be used, provided that pressure is applied to maintain the solvent in the system. The preferred reaction temperature is 150° C.

At a temperature of 150° C., the reaction time may range from 6 hours to about 22 hours. The reaction is preferably conducted for at least a period of 10 hours at 150° C. The amount of liquid product obtained is essentially the same when the reaction is conducted for 10 hours and 22 hours.

The manner of recovering the desired liquid product from the reaction mixture is not critical. The solid material may be removed by any conventional methods suitable for separating a solid and liquid phase, such as filtration, decantation, centrifuging, etc. The volatile materials, e.g., the solvent, may be also removed by conventional methods, e.g., distillation.

The following examples illustrate the invention. The parts in the examples are parts by weight.

Example 1

A mixture of 208 parts (1.0 mole) of phosphorus pentachloride, 75 parts (1.4 moles) of ammonium chloride, and 4.2 parts (0.1 mole) of lithium chloride and 1157 parts of 1,2,4-trichlorobenzene as solvent was charged to a 3-necked flask. The flask was equipped with a mechanical stirrer, thermometer, thermocouple well, heating mantle, and a reflux condenser with an outlet tube leading to a sodium hydroxide solution to trap the hydrogen chloride gas evolved during reaction. The mixture was heated to 150° C. and vigorous hydrogen chloride evolution occurred. The reaction was allowed to continue at 150° C. for a period of 22 hours. Upon cooling to 25° C., the mixture was filtered to remove lithium chloride and unreacted ammonium chloride. The 1,2,4-trichlorobenzene solvent was removed from the mixture by distillation at 95° C. at 15 mm. pressure. The remaining product mixture was cooled to approximately 25° C. and partially crystallized. The mixture was filtered to remove 33.6 parts of crystalline trimer and tetramer. The filtrate (79.0 parts) was the desired pale yellow, viscous liquid phosphonitrilic chloride polymeric composition. Elemental analysis of the product was as follows:

|  | Percent P | Percent N | Percent Cl |
| --- | --- | --- | --- |
| Calcd. for PNCl$_2$ | 26.7 | 12.1 | 61.2 |
| Found | 25.7 | 11.4 | 61.2 |

No detectable amount of lithium was found in the liquid product.

When a portion of this product was subjected to heating in air at 250–350° C., the temperature at which the liquid fraction prepared by the prior art method in the absence of lithium chloride polymerizes, the product was stable and did not undergo further polymerization to a rubbery solid. In fact, the product withstood further polymerization even upon heating in air up to a temperature of 490° C.

*Example 2*

The procedure of Example 1 was followed except that 11.7 parts (0.27 mole) of lithium chloride was added. The amount of the desired liquid phosphonitrilic chloride product obtained was 47.3 parts. The amount of crystalline product filtered off was 18.7 parts.

The liquid product withstood further polymerization to a rubbery solid upon being heated in air up to at least 400° C.

*Example 3*

The procedure of Example 1 was followed except that 21.2 parts (0.5 mole) of lithium chloride was used and the reaction time at 150° C. was 20 hours. The amount of desired liquid phosphonitrilic chloride product obtained was 38.3 parts. The crystalline product filtered from the mixture amounted to 14.4 parts.

When the liquid product was subjected to heating in air up to a temperature of 442° C., no further polymerization to a rubbery solid occurred, i.e., the liquid product remained stable. All of the liquid phosphonitrilic chloride polymeric products prepared in the examples exhibited the same infrared spectrum as an authentic sample of liquid phosphonitrilic chloride polymeric composition.

The present invention has been described in detail in the foregoing. However, it will be apparent that many variations may be introduced without departure from the scope of the invention. It is intended, therefore, to be limited only by the following claims.

I claim:
1. An improved process for preparing thermally stable phosphonitrilic chlorides which comprises heating at a temperature from 120° C. to 213° C. in 1,2,4-trichlorobenzene as inert solvent a mixture comprising phosphorus pentachloride, ammonium chloride, and lithium chloride, at least 1.0 mole of ammonium chloride being present for each mole of phosphorus pentachloride and from 0.05 mole to about 0.5 mole of lithium chloride being present for each mole of phosphorus pentachloride.
2. A process as claimed in claim 1, wherein the reaction is effected at a temperature of about 150° C.
3. A process as claimed in claim 1, wherein the amount of lithium chloride is 0.1 mole for each mole of phosphorus pentachloride.

References Cited by the Examiner

FOREIGN PATENTS 1,085,508  7/1960  Germany.

OTHER REFERENCES

Sneed et al., "Comprehensive Inorganic Chemistry," 1957, Volume VI, pages 78–79.

BENJAMIN HENKIN, *Primary Examiner.*

MAURICE A. BRINDISI, *Examiner.*